UNITED STATES PATENT OFFICE.

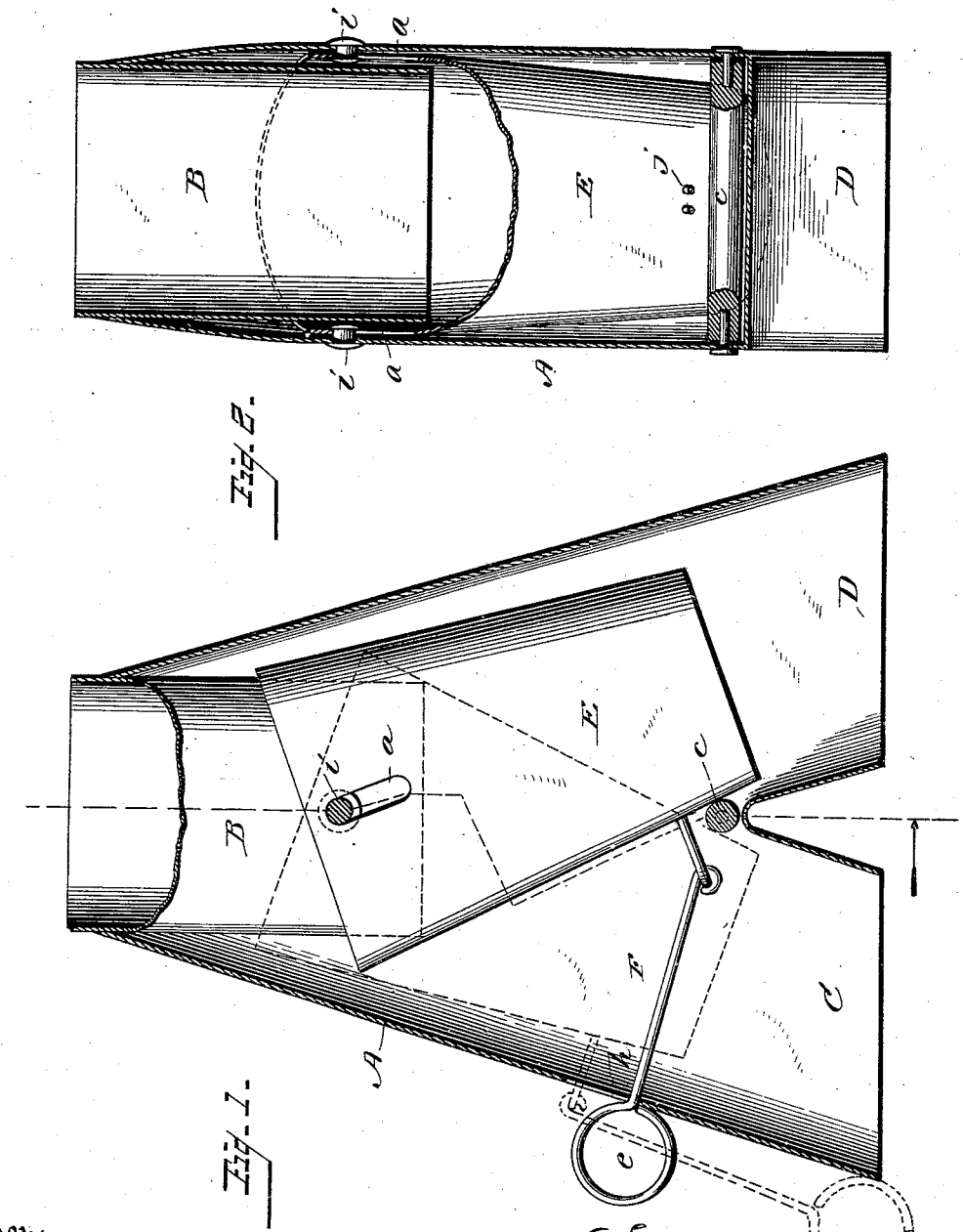

JOHN E. EVANS AND WILLIAM J. BEAR, OF COLUMBUS, OHIO.

WATER CUT-OFF.

SPECIFICATION forming part of Letters Patent No. 464,323, dated December 1, 1891.

Application filed February 28, 1891. Serial No. 383,202. (No model.)

*To all whom it may concern:*

Be it known that we, JOHN E. EVANS and WILLIAM J. BEAR, citizens of the United States of America, residing at Columbus, in the county of Franklin and State of Ohio, have invented certain new and useful Improvements in Water Cut-Offs, of which the following is a specification, reference being had therein to the accompanying drawings.

The object of our invention is to provide an improved water cut-off.

The nature and advantages of our improvement will be fully understood by those skilled in the art from the following description, and the points of novelty will be defined in the claims.

In the accompanying drawings, in the different figures of which like letters are placed upon corresponding parts, Figure 1 is a partial sectional view of a structure embodying our improvements; and Fig. 2 is a similar view illustrating further the interior arrangement, but looking in a direction at right angles to that in which Fig. 1 is seen.

A represents a casing to receive the parts of our cut-off.

B is a short pipe that fits in and extends down into the upper part of the casing A.

C and D are two openings or outlet-pipes at the lower end of the casing, one of which is intended to be connected with a waste or sewer pipe, while the other leads to a cistern or reservoir.

Over the lower end of the short pipe B is placed another short and preferably funnel-shaped piece of pipe E, which, for the sake of brevity, we will hereinafter call the "cut-off pipe." This cut-off pipe is provided at its upper and larger end with two slots $a$, (one on each of the diametrically-opposite sides of the cut-off pipe,) through which project guiding and supporting studs or the shanks of rivets $i$, secured in the sides of the casing A.

At or near the bridge between the two outlets in the lower end of the casing we propose in some instances to place a roller $c$, upon which the nether end of the cut-off pipe may rest and be moved with greater ease.

Loosely attached near the lower end of the cut-off pipe C is a rod F, which extends in a direction at right angles to the axis of the oscillatory motion of the cut-off pipe through a slot $h$ to the exterior of the casing and having its handle $e$ located within the plane of the pipes C D E. By means of said rod the cut-off pipe is moved from one outlet to the other.

The object of providing a slot in the casing through which to pass the handle is to enable the manipulator to exert a push or pull more nearly coincident with the direction in which the cut-off is to be moved than could be possible with a hole only sufficiently large to permit the passage of the rod.

It is obvious that by our invention the cut-off may be operated with the utmost ease, and thus reduce the liability to injury and displacement through rough handling.

By securing the bearing lugs or rivets $i$ in the casing A, instead of in the short pipe B, a firmer and more durable support for the cut-off pipe is obtained, and the short pipe B itself may, when destroyed by rust, be replaced with another without disturbing the other parts.

As it is desirable that the casing be arranged upon the cistern and waste pipes, so that the most usual position of the operating-rod F shall be within, it is obvious that whatever be the arrangement or location of said pipes with respect to each other the location of the operating-handle at the edge of the casing within the plane of the pipes C D E enables us to place our cut-off with either of its faces against a wall, and thus effect the desired result. In other words, our apparatus may be used as a right-hand or as a left-hand cut-off.

The operating-rod F will preferably be connected with a staple or other projection $j$ on the cut-off pipe sufficiently long to extend through the slot in the casing when the cut-off pipe is drawn over to the slotted side thereof, and hence said rod will hang down upon the side of the casing out of the way, as indicated in dotted lines, Fig. 1.

Having thus described our invention, what we claim, and desire to secure by Letters Patent, is—

1. A water cut-off comprising the casing A, having the inlet-pipe B and the outlet-pipes C D, an oscillating cut-off pipe E, pivoted therein, and an operating-rod F, attached to said cut-off pipe and extending at right angles to the axis of the cut-off pipe and having its handle located within the plane of the pipes C D E, substantially as shown and described.

2. In a water cut-off, the outlet-pipes C D, the oscillating cut-off pipe E, the casing A, having a slot $h$, the said slot located within the plane of the pipes C D E, a projection $j$ on said cut-off pipe, adapted to extend through the slot when the cut-off pipe is at the slotted side of the casing, and an operating-rod F, pivotally connected to said projection, whereby the rod may be within the plane of the pipes C D E and at the same time be turned against the side of the casing, substantially as shown and described.

In testimony whereof we affix our signatures in presence of two witnesses.

JOHN E. EVANS.
WILLIAM J. BEAR.

Witnesses:
C. O. HUNTER,
N. B. LESLIE.